United States Patent
Cheong

(10) Patent No.: US 7,764,733 B1
(45) Date of Patent: Jul. 27, 2010

(54) CONSTELLATION RECOVERY FOR QUADRATURE AMPLITUDE MODULATION

(75) Inventor: Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 774 days.

(21) Appl. No.: 11/491,326

(22) Filed: Jul. 21, 2006

Related U.S. Application Data

(60) Provisional application No. 60/734,453, filed on Nov. 8, 2005, provisional application No. 60/815,503, filed on Jun. 20, 2006.

(51) Int. Cl.
  *H03H 7/30* (2006.01)
(52) U.S. Cl. .................................. 375/235; 375/331
(58) Field of Classification Search ................. 375/261, 375/232–235
  See application file for complete search history.

(56) References Cited

U.S. PATENT DOCUMENTS

| | | | | |
|---|---|---|---|---|
| 5,321,725 A | * | 6/1994 | Paik et al. ................... | 375/265 |
| 5,471,508 A | * | 11/1995 | Koslov ....................... | 375/344 |
| 6,011,814 A | * | 1/2000 | Martinez et al. ............ | 375/233 |
| 6,842,495 B1 | * | 1/2005 | Jaffe et al. ................... | 375/326 |
| 7,006,565 B1 | * | 2/2006 | Endres et al. ............... | 375/233 |
| 2005/0276362 A1 | * | 12/2005 | Yu et al. ..................... | 375/347 |
| 2006/0274836 A1 | * | 12/2006 | Sampath et al. ............ | 375/242 |
| 2009/0059960 A1 | * | 3/2009 | Li .............................. | 370/498 |

OTHER PUBLICATIONS

Al-Dhahir, Naofal et al., "Efficient Computation of the Delay-Optimized Finite-Length MMSE-DFE," *IEEE Transactions on Signal Processing*, vol. 44, No. 5, May 1996, pp. 1288-1292.

Godard, Dominique N., "Self-Recovering Equalization and Carrier Tracking in Two-Dimensional Data Communication Systems," IEEE Transactions on Communications, vol. Com-28, No. 11, Nov. 1980.

* cited by examiner

*Primary Examiner*—Emmanuel Bayard

(57) ABSTRACT

Methods and apparatus are provided for receiving an input signal. In an embodiment of the invention a current candidate QAM constellation can be selected. A mean squared error of a signal responsive to the input signal can be computed based on the current candidate QAM constellation. The computed mean squared error can be compared to a threshold error value. The invention advantageously allows for relatively efficient and relatively reliable equalization of signals transmitted with an unknown QAM constellation, and allows for relatively efficient and reliable recovery of the unknown QAM constellation.

46 Claims, 13 Drawing Sheets

CONSTELLATION RECOVERY FOR QUADRATURE AMPLITUDE MODULATION

CROSS-REFERENCE TO RELATED APPLICATION

This application claims the benefit of provisional application No. 60/734,453, filed Nov. 8, 2005, and the provisional application No. 60/815,503, filed by applicant on Jun. 20, 2006, which are hereby incorporated by reference herein in their entireties.

BACKGROUND OF THE INVENTION

This application relates to digital communication. More particularly, this application relates to blind constellation recovery of quadrature amplitude modulated signals.

Communication involves a transmitter encoding a message in a signal which is sent across a channel to a receiver. Depending on the channel characteristics, the signal may be corrupted when traveling through the channel. A key challenge in communication theory is how channel. A key challenge in communication theory is how to overcome this corruption, to reliably and efficiently extract the message from a received signal. An equalizer is a device designed to compensate for signal corruption by tuning a set of filter values used to filter the received signal. In some applications, the equalizer tunes its filter values using a training signal (e.g., a signal sent before the message signal and whose uncorrupted version is known by the equalizer). In applications where the transmitter does not send a training signal, the equalization is referred to as "blind equalization."

The process by which the equalizer tunes its filter values may depend on how the transmitter modulates an electronic signal to encode the information in the message. Electronic signals used in communication are generally characterized by at least three well-known properties—frequency, amplitude, and phase—any one of which can be used to represent information. For example, AM radio stations use electromagnetic signals that contain information in their amplitudes, and FM radio stations use electromagnetic signals that contain information in their frequencies. In general, the process of producing a signal that contains information in its frequency, amplitude, and/or phase is called modulation, and the counterpart process of retrieving information from such a signal is called demodulation or detection. For example, for a radio station, AM stands for amplitude modulation and FM stands for frequency modulation.

AM and FM communication protocols are mainly used in radios that communicate analog audio information, and other communication protocols are generally used to communicate digital information. One popular digital communication protocol is known as quadrature amplitude modulation (QAM), in which the communication signal is a combination of two amplitude-modulated sinusoidal signals that have the same frequency but that are $\pi/2$ radians apart in phase, i.e., "in quadrature." Another name for QAM is I/Q modulation, where the "I" refers to the sinusoidal signal "in phase" and the "Q" refers to the sinusoidal signal "in quadrature" with respect to the in-phase signal.

Electronic signals in communication, including QAM signals, can be represented as complex functions, i.e., functions that have both a real and an imaginary part. Complex functions can be plotted on a complex plane in which the horizontal axis represents the real part of the function and the vertical axis represents the complex part of the function. The use of complex functions is a conceptual tool that provides a convenient way to represent signal amplitude and phase. For example, suppose a signal is characterized by the complex function $s(t)=r(t)+j\cdot m(t)$, where $r(t)$ and $m(t)$ are real-valued functions and j designates the imaginary part of the complex function. Using the complex function, the magnitude of the signal $s(t)$ can be computed by $|s(t)|=\sqrt{(r(t))^2+(m(t))^2}$, and the phase of the signal can be computed by $$\angle s(t) = \arctan\left(\frac{m(t)}{r(t)}\right).$$

As another example, operations that change the frequency content of a signal can also be described using complex numbers and Fourier transforms. For example, one skilled in the art will recognize that multiplying a signal $s(t)$ with the complex sinusoid $e^{j\omega_c t}=\cos(\omega_c t)+j\cdot\sin(\omega_c t)$ in the time domain will produce a resulting signal $s'(t)=s(t)e^{j\omega_c t}$, in which the frequency content of $s'(t)$ is shifted by $\omega_c$ compared to $s(t)$.

In QAM, the two signals transmitted in quadrature may be cosine and sine signals, each having a particular amplitude. The communication signal, which is a combination of these two component signals, may be expressed theoretically as $$s(t)=s_{I,k}\delta(t-kT)\cos(\omega_c t)+s_{Q,k}\delta(t-kT)\sin(\omega_c t),$$

where $\omega_c$ is the angular frequency, $$T = \frac{2\pi}{\omega_c}$$

is the sampling interval, k is an integer sample index, $\delta(t-kT)$ is the time-shifted ideal impulse function, and $s_{I,k}$ and $s_{Q,k}$ are real values representing the amplitudes of, respectively, the cosine and sine signals at sample k.

Each available pair of values $(s_{I,k}, s_{Q,k})$ is called a "signal point," and the set of all available signal points is called a "constellation." Constellations are commonly represented by plotting the available signal points on a two-dimensional graph with the horizontal axis representing possible values of $s_{I,k}$ and the vertical axis representing possible values of $s_{Q,k}$. The number M of signal points in a constellation determines the amount of information that is associated with each signal point. In general, each signal point can represent $b=\lfloor\log_2 M\rfloor$ bits of information, where M is usually a power of two. If the number of bits per signal point is even, for example when M is 16, 64, or 256, transmitters often use "square constellations"—constellations whose signal points form a square when graphed. If the number of bits is odd, for example when M is 32 or 128, transmitters often use "cross constellations"—constellations whose signal points form a cross when graphed, e.g., a square without points at its corners.

Equalization of QAM signals usually requires the receiver to know which specific constellation the transmitter used to modulate the signal. Using this knowledge, the receiver performs an equalization training algorithm, which implements a least mean square (LMS) algorithm, designed to minimize mean squared detection error, to tune the filter values of its equalizer. In particular, the LMS algorithm can be a function of a constant R, whose value varies with the constellation size.

In certain applications, the receiver not only contends with signal corruption, but also does not know which constellation the transmitter used to perform QAM. Instead, the receiver knows only that the constellation is one of a set of different square and cross constellations, and typically equalizes the channel by assuming in turn which constellation is correct and applying the training algorithm with the appropriate R value corresponding to each assumption. When the receiver assumes an incorrect constellation, the set of filter values typically does not converge to a set of values during the training algorithm and the signal-to-noise ration (SNR) remains relatively low. Only when the receiver assumes the correct constellation do the filter values converge during the training algorithm to equalize the channel and yield a relatively high SNR.

Cable television (TV) is an example of an application requiring blind equalization with an unknown constellation. A cable TV box may receive signals from multiple providers, each of whom may use a different constellation to modulate a transmitted signal. Each time a user changes channels when watching cable TV, the receiver may equalize and decode the newly received signal, without a training signal and without knowing the underlying constellation, to create the visual image seen by the user on his TV. Because the equalization process must finish before the user can view the visual image, the amount of time required for equalization can be an important performance metric for any equalizer design.

The current equalization process requires the receiver to perform the training algorithm up to as many times as the number of possible constellations, requiring a relatively significant number of computations. As communication standards evolve, additional constellations may be used, further increasing the number of possible constellations and thus the number of computations necessary to perform blind equalization. A need remains for a more efficient method of performing blind equalization of QAM signals with an unknown constellation. Also, with an efficient method of performing blind equalization of QAM signals with an unknown constellation, a need remains for a relatively efficient method of identifying the underlying constellation of a QAM signal.

SUMMARY OF THE INVENTION

In accordance with this invention, methods and apparatus are provided for receiving an input signal. In one aspect of the invention, a current candidate QAM constellation can be selected. A mean squared error of a signal responsive to the input signal can be computed based on the current candidate QAM constellation. The computed mean squared error can be compared to a threshold error value.

Another aspect of the invention can include receiver circuitry for receiving an input signal. The receiver circuitry can include constellation recovery circuitry. The constellation recovery circuitry can select a current candidate QAM constellation. Based on the current candidate QAM constellation, the constellation recovery circuitry can compute a mean squared error of a signal responsive to the input signal. The constellation recovery circuitry can compare the computed mean squared error to a threshold error value.

In another aspect of the invention, receiver circuitry for receiving an input signal can include current candidate selector means for selecting a current candidate QAM constellation. The receiver circuitry can include mean squared error computing means for computing a mean squared error of a signal responsive to the input signal, based on the current candidate QAM constellation. The receiver circuitry can include mean squared error comparison means for comparing the computed mean squared error to a threshold error value.

In one embodiment, the receiver circuitry can include previous candidate selector means for selecting a previous candidate QAM constellation. The receiver circuitry can include identification means for identifying the previous candidate QAM constellation as a recovered QAM constellation, based on a result of the comparison means. In particular, the identification means can identify the previous candidate QAM constellation as a recovered QAM constellation if the computed mean squared error is substantially greater than the threshold error value. The current candidate selector means can set a candidate QAM constellation index to a number corresponding to the current candidate QAM constellation. The identification means can set an output QAM constellation index to be substantially equal to the previous candidate QAM constellation index.

In another embodiment, the receiver circuitry can include occurrence rate comparison means for comparing a measured occurrence rate of the signal responsive to the input signal at a selected point in the current candidate QAM constellation to an occurrence threshold value. As an example, the selected point can be a corner point of the current candidate QAM constellation. The occurrence threshold value can be substantially equal to a factor multiplied by an expected occurrence rate at the selected point of the signal responsive to the input signal. More particularly, the factor can be substantially less than 1. The occurrence rate comparison means can compare the measured occurrence rate to the occurrence threshold value if the computed mean squared error is substantially less than the threshold error value. The receiver circuitry can include threshold setting means for setting a next threshold error value to be substantially equal to the computed mean squared error. For instance, the threshold setting means can set the next threshold error value if the measured occurrence rate is substantially greater than the occurrence threshold value.

In another embodiment, the receiver circuitry can include next candidate selector means for selecting a next candidate QAM constellation if the computed mean squared error is substantially less than the threshold error value. In yet another embodiment, the threshold setting means can set the threshold error value to be substantially equal to infinity.

In another embodiment, the receiver circuitry of the invention can further include blind equalization means for performing blind equalization on the input, where the signal responsive to the input signal is responsive to an output signal of the blind equalization means. The receiver circuitry can include alteration means for altering the blind equalization means based on a recovered QAM constellation. In particular, the blind equalization means can filter the input signal with a plurality of filter values. The alteration means can alter at least one value of the plurality of filter values.

In another embodiment, the receiver circuitry can further include factor means for generating a scaling factor based on the recovered QAM constellation. The receiver circuitry of the invention can also include scaling means for scaling the output signal of the blind equalization means by the scaling factor to generate a scaled output signal. The receiver circuitry can include decision directed equalization means for performing decision directed equalization on the input signal. The decision directed equalization means can select a point from the recovered QAM constellation, where the selected point corresponds to a value of the scaled output signal. The alteration means can alter the blind equalization based on the selected point.

The receiver circuitry described above can be included in any suitable application, such as a television or a set-top box.

In yet another aspect of the invention, a computer program running on a processor can receive an input signal. The computer program can select a current candidate QAM constellation. Based on the current candidate QAM constellation, the computer program can compute a mean squared error of a signal responsive to the input signal. The computer program can compare the computed mean squared error to a threshold error value.

In one embodiment, the computer program can select a previous candidate QAM constellation. Based on a result of comparing the computed mean squared error to the threshold error value, the computer program can identify the previous candidate QAM constellation as a recovered QAM constellation. In particular, the computer program can identify the previous candidate QAM constellation as a recovered QAM constellation if the computed mean squared error is substantially greater than the threshold error value. The computer program, when selecting the current candidate QAM constellation, can set a candidate QAM constellation index to a number corresponding to the current candidate QAM constellation. The computer program can also set, when identifying the previous candidate QAM constellation as the recovered QAM constellation, an output QAM constellation index to be substantially equal to the previous candidate QAM constellation index.

In another embodiment, the computer program can compare a measured occurrence rate of the signal responsive to the input signal at a selected point in the current candidate QAM constellation to an occurrence threshold value. As an example, the selected point can be a corner point of the current candidate QAM constellation. The occurrence threshold value can be substantially equal to a factor multiplied by an expected occurrence rate at the selected point of the signal responsive to the input signal. The factor can be substantially less than 1. More particularly, the computer program can compare the measured occurrence rate to the occurrence threshold value if the computed mean squared error is substantially less than the threshold error value. The computer program can set a next threshold error value to be substantially equal to the computed mean squared error. For instance, the computer program can set the next threshold error value if the measured occurrence rate is substantially greater than the occurrence threshold value.

In another embodiment, the computer program can select a next candidate QAM constellation if the computed mean squared error is substantially less than the threshold error value. In yet another embodiment, the computer program of the invention can also set the threshold error value to be substantially equal to infinity.

In another embodiment, the computer program can perform blind equalization on the input signal, where the signal responsive to the input signal is responsive to an output signal of the blind equalization. The computer program can alter the blind equalization based on a recovered QAM constellation. In particular, the blind equalization can filter the input signal with a plurality of filter values. The computer program, when altering the blind equalization, can alter at least one value of the plurality of filter values.

In another embodiment, the computer program can generate a scaling factor based on the recovered QAM constellation. The computer program can scale the output signal of the blind equalization by the scaling factor to generate a scaled output signal. The computer program of the invention can also perform decision directed equalization on the input signal. The decision directed equalization can select a point from the recovered QAM constellation, where the selected point corresponds to a value of the scaled output signal. The computer program can alter the blind equalization based on the selected point.

The computer program described above can be included in any suitable application, such as a television or a set-top box.

The invention therefore allows for relatively efficient equalization of an input signal and identification of an underlying QAM constellation. Advantageously, the invention allows such equalization and identification with relatively accurate performance and relatively low complexity.

BRIEF DESCRIPTION OF THE DRAWINGS

The above and other objects and advantages of the invention will be apparent upon consideration of the following detailed description, taken in conjunction with the accompanying drawings, in which like reference characters refer to like parts, and in which.

DETAILED DESCRIPTION OF THE INVENTION

Figure 1:
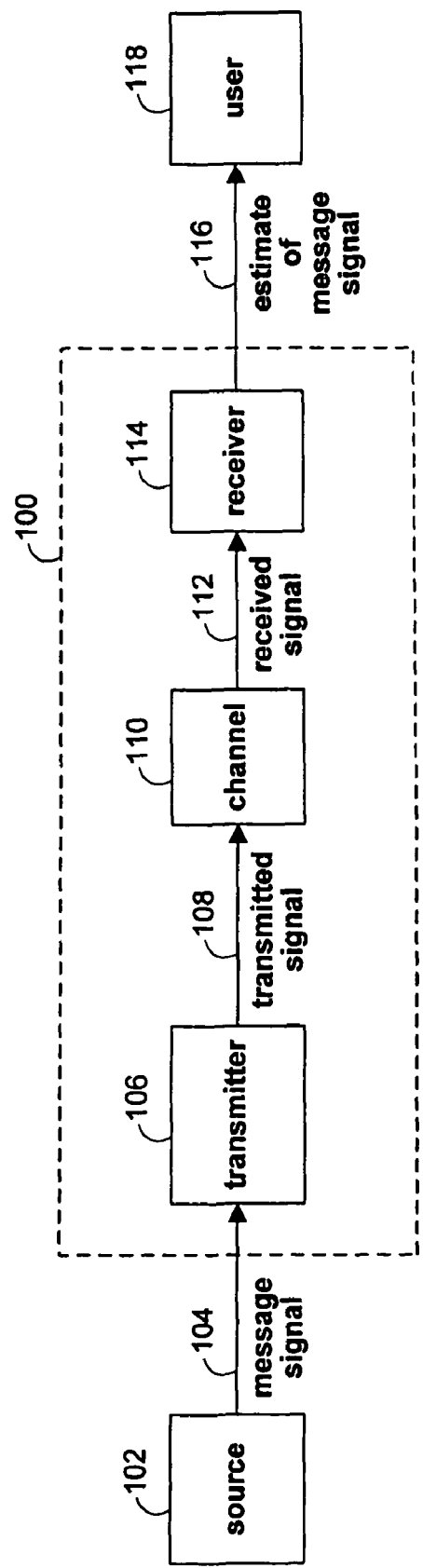
FIG. 1 depicts a block diagram of an illustrative communication system that can employ the disclosed technology.

FIG. 1 depicts a block diagram of an illustrative communication system 100 that can send information from a source 102 to a user 118. Source 102 can send a sequence of values known as a message signal 104 via a transmitter 106 that can use QAM to modulate a signal to encode message signal 104. A QAM constellation used by transmitter 106 is herein referred to as an "underlying constellation." A transmitted signal 108 carrying message signal 104 can travel across a channel 110 that potentially distorts transmitted signal 108 through various forms of corruption, such as dispersion, jitter, and noise. The nature and extent of the corruption displayed by a received signal 112 at the end of channel 110 can depend on individual channel characteristics that can be time-varying. A receiver 114 can process received signal 112 to generate an estimate 116 of message signal 104 to send to user 118.

The invention disclosed herein can advantageously compensate for corruption from channel 110, and can be used in receiver 114.

Figure 2:
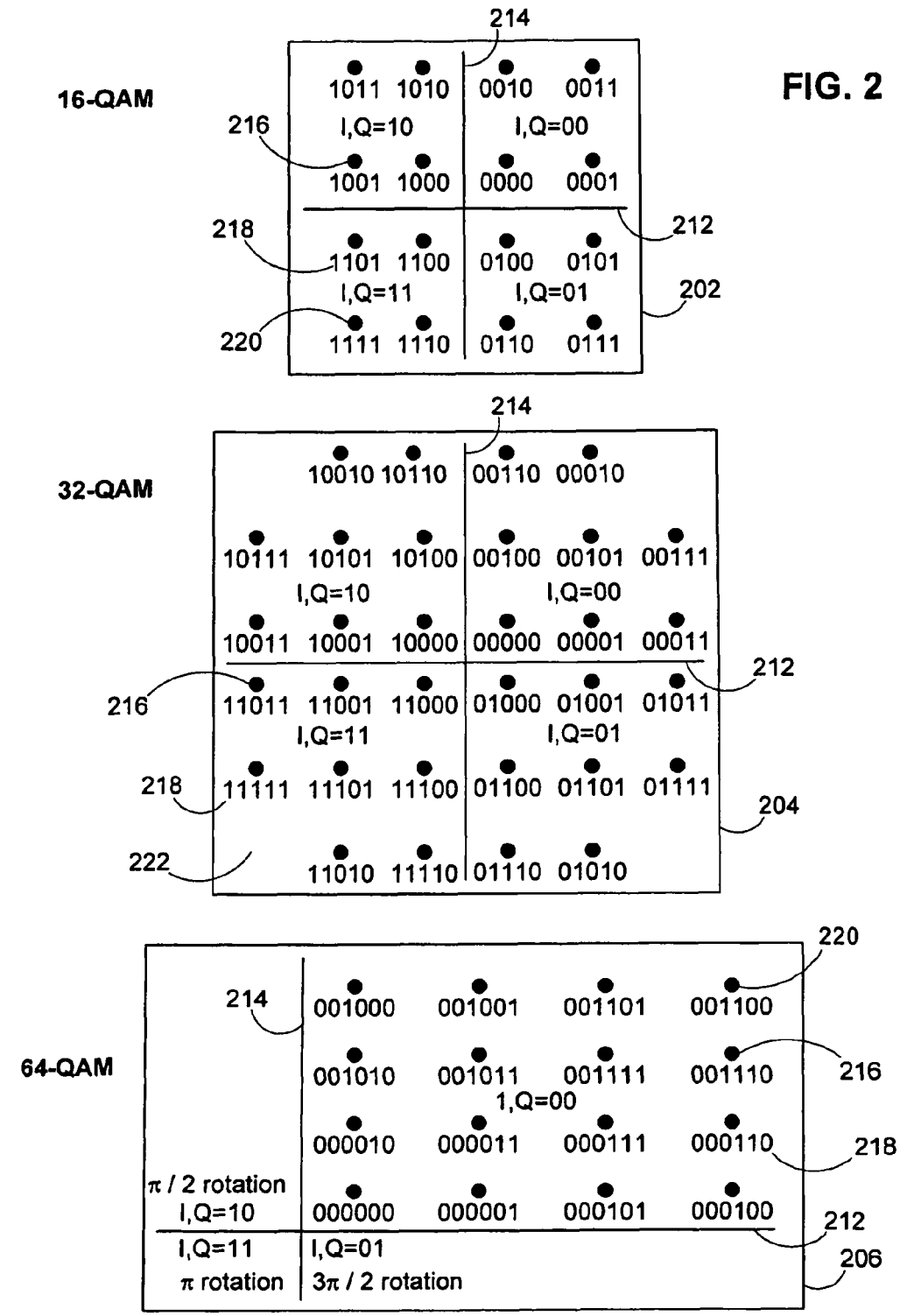
FIG. 2 depicts sample constellations that can be used for QAM.

FIG. 2 depicts sample constellations 200 that can be used for QAM. The constellations depicted are "16-QAM" 202, "32-QAM" 204, and "64-QAM" 206, where the numbers 16, 32, and 64, refer to the number of signal points in the constellation, also known as a "constellation size." Each constellation depicts its signal points 216 on a graph whose horizontal axis 212 and vertical axis 214 represent the amplitudes of, respectively, the in-phase and in-quadrature signals of QAM. Each signal point 216 represents a corresponding string of values 218, such that a series of signal points 216 can represent a message signal (e.g., message signal 104 of FIG. 1). For ease of illustration, the values discussed herein are generally binary in nature. However, it will be understood that any appropriate types of values can be used.

16-QAM 202 and 64-QAM 206 are square constellations, meaning the signal points of the constellation are graphed in a square formation. Each square constellation has four corner points 220, which are signal points at the corners of the square formation. Other constellation sizes may also form square constellations, such as a 256-QAM that has 256 signal points. In contrast, 32-QAM 204 is a cross constellation, meaning the signal points of the constellation are graphed in a cross formation. A cross formation differs from a square formation because it lacks signal points at the corners 222 of the formation. Other constellation sizes may also form cross constellations, such as a 128-QAM that has 128 signal points in a square formation missing 4 signal points at each corner. It will be noted that, for ease of illustration, only a quarter of the signal points of 64-QAM 206 are shown.

Figure 3:
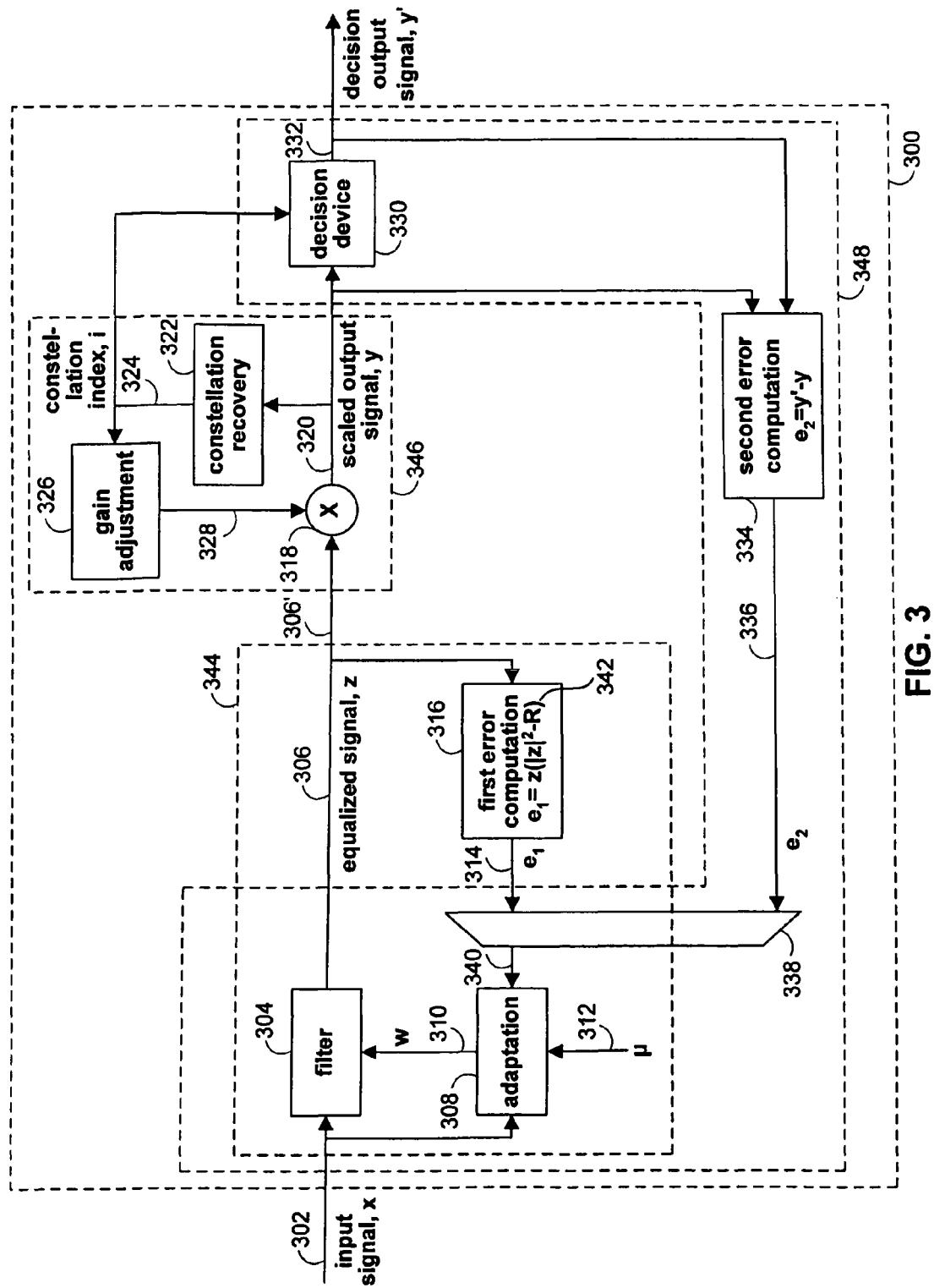
FIG. 3 depicts a block diagram of illustrative equalization circuitry in accordance with an embodiment of the invention.

FIG. 3 depicts a block diagram of illustrative equalization circuitry 300 in accordance with an embodiment of the invention. Equalization circuitry 300 can be used in a situation where the underlying constellation is not known, but a set of candidate constellations is known. In one embodiment, the candidate constellations can be any square or cross constellations, such as sample constellations 200 depicted in FIG. 2.

Equalization circuitry 300 can be used in a receiver, such as receiver 114 of FIG. 1. Equalization circuitry 300 can include blind equalization circuitry 344, constellation recovery system 346 and decision-directed equalization circuitry 348. As illustrated in FIG. 3, blind equalization circuitry 344 and decision-directed equalization circuitry 348 can overlap, at least in part.

Blind equalization circuitry 344 can preferably scale input signal 302 so that it has approximately unit energy, meaning the maximum amplitudes of the in-phase and in-quadrature signals are each approximately equal to a reference level of unit energy. In accordance with an embodiment of the invention, blind equalization circuitry 344 can include an adaptive filter 304, error computation circuitry 316, and adaptation circuitry 308. Based on a result generated by error computation circuitry 316, adaptation circuitry 308 can modify adaptive filter 304 to generate an equalized signal 306'. In one embodiment, input signal 302 can be processed by adaptive filter 304 to generate filter output signal 306. Adaptive filter 304 preferably convolves input signal 302 with a plurality of filter values 310, which are modifiable.

Filter output signal 306 can be processed by error computation circuitry 316 to generate a first error signal 314. Error computation circuitry 316 can use an error function 342, which preferably uses a second-order statistic of filter output signal 306. In one embodiment, error function 342 can be $$e=z(|z|^2-R),$$

where e is a value of error signal 314, z is a corresponding value of filter output signal 306, and R is a constant whose value depends on the size of the underlying constellation. For example, if input signal 302 has approximately unit energy, then R can be substantially equal to 1.35.

Multiplexer 338 can be operable to receive first error signal 314 and a second error signal 336 as inputs, and generate a multiplexer output signal 340. Multiplexer 338 preferably selects first error signal 314 when equalization circuitry 300 is performing blind equalization. Multiplexer output signal 340 can be processed by adaptation circuitry 308 to generate the plurality of filter values 310 for adaptive filter 304. Adaptation circuitry 308 preferably uses a minimum mean squared error (MMSE) algorithm to modify the plurality of filter values 310. In one embodiment, the adaptation can perform a least mean square (LMS) algorithm, which has as inputs error signal 314, input signal 302, and an adaptation constant 312. LMS algorithms are well known in the art as a method for progressively approaching a state with relatively low error. In one implementation, LMS algorithm can update a vector $w_k$ containing the plurality of filter values 310 using the following equation:

$$w_{k+1}=w_k+\mu e_k x_k,$$

where $w_{k+1}$ is a vector of a next plurality of filter values 310, $w_k$ is a vector of a current plurality of filter values 310, $\mu$ is adaptation constant 312, $e_k$ is a current value of error signal 314, and $x_k$ is a vector of both current and past values of input signal 302.

If R has a value corresponding to the size of the underlying constellation, over time the plurality of filter values 310 can converge and filter output signal 306 can have a substantially high signal-to-noise ratio (SNR). At this point, filter output signal 306 can generate an equalized signal 306' substantially free of channel corruption.

In accordance with an embodiment of the invention, error computation circuitry 316 can maintain the same value of R throughout the blind equalization process, instead of varying it to match each candidate constellation. By performing blind equalization using only a single value of R, blind equalization circuitry 344 can advantageously equalize input signal 302 without determining which constellation was used to encode input signal 302, thereby separating equalization of input signal 302 from identification of the underlying constellation. This separation can substantially reduce the amount of computation required.

In accordance with an embodiment of the invention, constellation recovery system 346 can be operable to receive equalized signal 306' from blind equalization circuitry 344 and identify the constellation used to encode input signal 302. After constellation recovery system 346 identifies the underlying constellation of input signal 302, it can scale equalized signal 306' to have substantially the same amount of energy as a signal that has been modulated using the underlying constellation.

In one embodiment, constellation recovery system 346 can include scaler circuitry 318, constellation recovery circuitry 322, and gain adjustment circuitry 326. Scaler circuitry 318 can scale equalized signal 306' by a scaling factor 328 to generate a scaled output signal 320. Scaled output signal 320 can be processed by constellation recovery circuitry 322, whose operation is described below in reference to FIG. 5, to generate a constellation index 324. Constellation index 324 can in turn be processed by gain adjustment circuitry 326 to generate scaling factor 328. In one embodiment, gain adjustment circuitry 326 can generate a scaling factor 328 that is substantially equal to a square root of a ratio of energies. The ratio of energies can be a fraction whose numerator is the amount of energy of a signal modulated using a constellation with constellation index 324, and whose denominator is the unit energy described above. Scaled output signal 320 preferably represents an equalized signal having substantially the same energy as a signal transmitted using QAM with the underlying constellation.

As discussed above, equalization circuitry 300 can process input signal 302 using blind equalization circuitry 344. Once blind equalization circuitry 344 has substantially stabilized at least one filter value of filter circuitry 304, constellation recovery system 346 can identify the underlying constellation and scale equalized signal 306'. Constellation recovery system 346 can also be configured to receive and identify underlying constellations of equalized signals generated by non-blind equalization circuitry.

Equalization circuitry 300 can advantageously decouple the equalization of an input signal from the identification of an underlying constellation of that input signal. In contrast, known equalization circuitries generally perform the equalization and identification simultaneously. For example, known equalization circuitries might perform a blind equalization algorithm multiple times, each time assuming that a different candidate constellation is the underlying constellation, until an input signal is sufficiently equalized. Under this approach, the first candidate constellation that yields sufficient equalization of the input signal might be selected as the underlying constellation. In contrast, equalization circuitry 300 can perform a blind equalization algorithm once to equalize input signal 302, using blind equalization circuitry 344, and separately identify the underlying constellation using constellation recovery system 346. This decoupled approach of the invention can advantageously reduce the amount of computation required to equalize a received input signal. For example, if known equalization circuitry requires approximately 250 values of input signal 302 to select a constellation from a set of 5 candidate constellations, equalization circuitry 300 might require only about 60 values of input signal 302 to perform the same selection.

Equalization circuitry 300 can also alter blind equalization circuitry 344, either concurrently with the operation of constellation recovery system 346 or after constellation recovery system 346 has identified a constellation index 324. In one embodiment, equalization circuitry 300 can alter blind equalization circuitry 344 using decision-directed equalization circuitry 348, which is coupled to constellation recovery system 346. As a result of using decision-directed equalization circuitry 348, equalization circuitry 300 can generate a more accurate equalized signal 306'. The differences in accuracy are discussed below and demonstrated by example in reference to FIGS. 7 and 8. (It will be understood that the term "coupled," as used herein, can define either a direct or an indirect connection between elements.)

In accordance with an embodiment of the invention, decision-directed equalization circuitry 348 can be operable to receive scaled output signal 320 from constellation recovery system 346 and alter blind equalization circuitry 344. Multiplexer 338 preferably selects second error signal 336 when equalization circuitry 300 is performing decision-directed equalization using decision-directed equalization circuitry 348. In this case, equalization circuitry 300 can process input signal 302 based at least in part on second error signal 336.

Performing decision-directed equalization can improve the accuracy of equalized signal 306'. Second error signal 336 can generally represent the amount of error present in equalized signal 306'. In particular, second error signal 336 can be generated by decision-directed equalization circuitry 348, which can include a decision device 330 and second error computation circuitry 334. Decision device 330 can select a signal point from the constellation with constellation index 324 to match a value of scaled output signal 320, using any appropriate metric (e.g., proximity in the I/Q plane). In one embodiment, decision device 330 can generate a decision output signal 332 whose values can each represent a signal point from the constellation having constellation index 324. Signal points represented by values of decision output signal 332 are preferably relatively close in value to a corresponding value of scaled output signal 320. Second error computation circuitry 334 can use scaled output signal 320 and decision output signal 332 to compute second error signal 336. In one implementation, each element of second error signal 336 can be a difference between a value of decision output signal 332 and a corresponding value of scaled output signal 320.

By selecting second error signal 336, multiplexer 338 can feedback information about equalized signal 306' to blind equalization circuitry 344. In particular, multiplexer 338 preferably selects second error signal 336 when equalization circuitry 300 is performing decision-directed equalization using decision-directed equalization circuitry 348. In this case, as in the case above when first error signal 314 is selected, multiplexer output signal 340 can be processed by adaptation circuitry 308 to generate the plurality of filter values 310 for adaptive filter 304.

Decision-directed equalization circuitry 348 can advantageously reduce the corruption displayed by equalized signal 306', thereby allowing decision device 330 to more accurately select signal points that represent a message signal encoded in input signal 302. In particular, if equalized signal 306' displays less corruption, then a scaled version of equalized signal 306', such as scaled output signal 320, may also display less corruption. As a result, a value of scaled output signal 320 is more likely to be mapped to the correct constellation signal point by decision device 330. Thus, decision output signal 332 is more likely to contain values that accurately represent the encoded message.

Equalization circuitry 300 and other suitable approaches to performing blind equalization are further described in copending, commonly-assigned U.S. patent application Ser. No. 12/712,021, entitled "Efficient Blind Equalization for Quadrature Amplitude Modulation" and filed concurrently, which is hereby incorporated by reference herein in its entirety.

Figure 4:
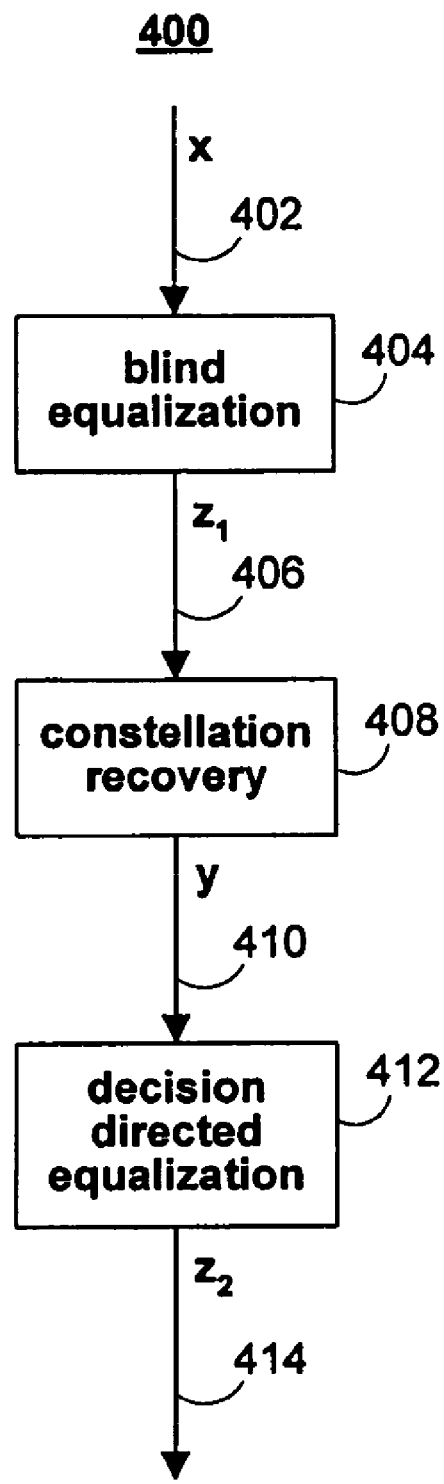
FIG. 4 depicts a flow diagram of an illustrative equalization algorithm in accordance with an embodiment of the invention.

FIG. 4 depicts a flow diagram of an illustrative equalization algorithm 400 which starts with the receipt of an input signal 402, transmitted using QAM with an unknown underlying constellation. Input signal 402 can be received by a receiver, such as receiver 114 of FIG. 1. Although the underlying constellation is not known, a set of candidate constellations is known. In one embodiment, the candidate constellations can be any square or cross constellations, such as sample constellations 200 depicted in FIG. 2.

Step 404 can perform a blind equalization algorithm on input signal 402 to generate a first equalized signal 406. This blind equalization algorithm of step 404 can filter a signal coupled to input signal 402 using a plurality of filter values that are modifiable. Step 404 can also compute a first error signal that can be used to modify the plurality of filter values. The blind equalization algorithm of step 404 can be similar to that performed by blind equalization circuitry 344 described above in reference to FIG. 3.

Step 408 can perform a constellation recovery algorithm on first equalized signal 406 to generate a scaled output signal 410. This constellation recovery algorithm can identify a constellation index, and then use the identified constellation index to scale first equalized signal 406. Step 408 can use a constellation recovery algorithm similar to an algorithm 500 described below in reference to FIG. 5. The constellation recovery algorithm of step 408 can be similar to that used by constellation recovery system 346 described above in reference to FIG. 3.

Step 412 can perform a decision-directed equalization algorithm on scaled output signal 410 to generate a second equalized signal 414. This decision-directed equalization algorithm can further modify the plurality of filter values of step 404. Step 412 can select a signal point closest in value to a corresponding value of scaled signal 410, and compute a second error signal that can be used to modify the plurality of filter values. The decision-directed equalization algorithm of step 412 can be similar to that performed by decision-directed equalization circuitry 348 described above in reference to FIG. 3.

In another embodiment, step 408 and step 412 can perform the constellation recovery of step 408 and decision-directed equalization algorithm of step 412 concurrently. In yet another embodiment, efficient equalization algorithm 400 can perform steps 404 and 408 without performing step 412.

Figure 5:
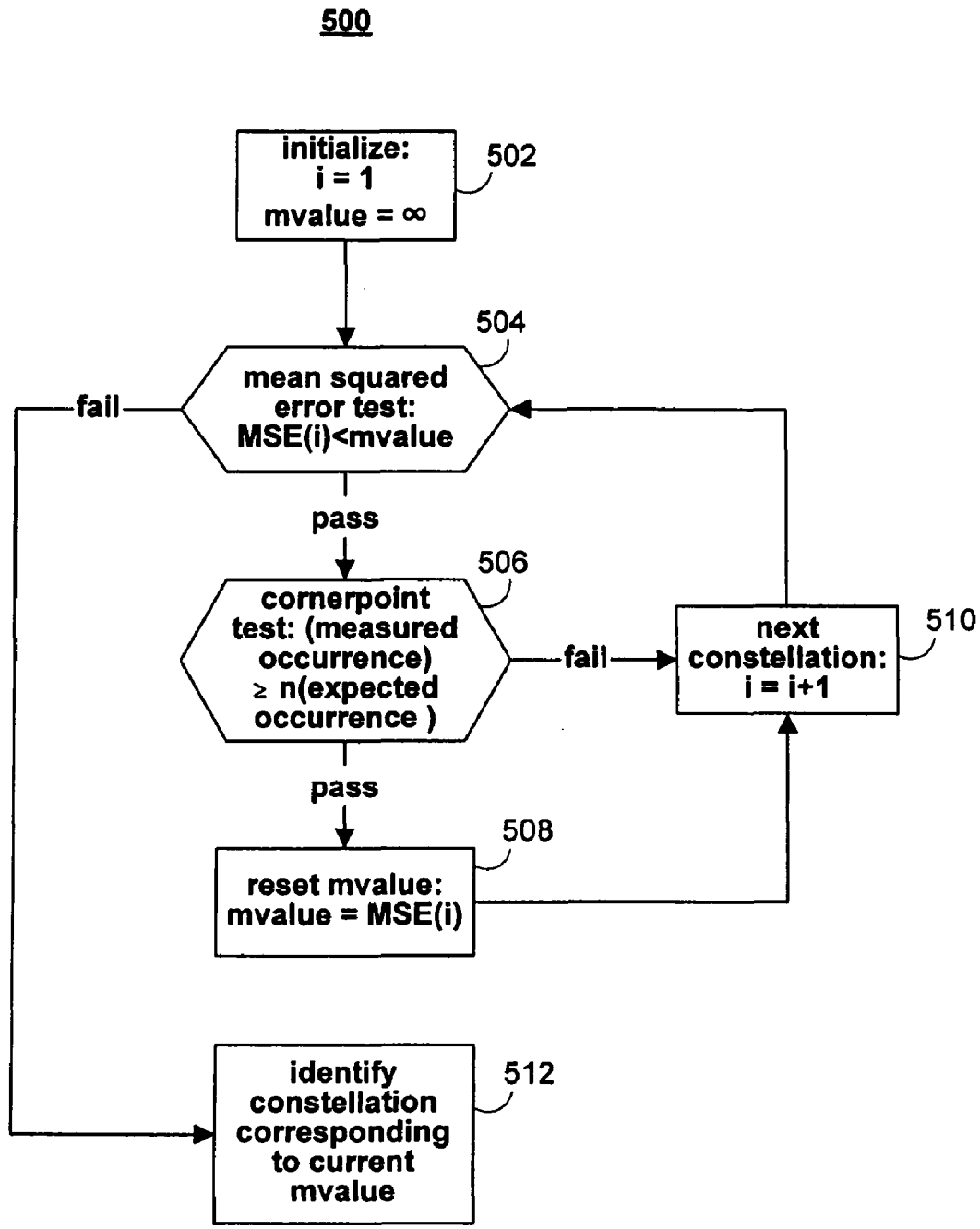
FIG. 5 depicts a flow diagram of an illustrative constellation recovery algorithm in accordance with an embodiment of the invention.

FIG. 5 depicts a flow diagram of an illustrative constellation recovery algorithm 500 which can identify a constellation index for an input signal transmitted using QAM with an unknown underlying constellation. Although the underlying constellation is not known, a set of candidate constellations is known. In one embodiment, the candidate constellations can be any square or cross constellations, such as sample constellations 200 depicted in FIG. 2.

Constellation recovery algorithm 500 preferably includes at least one test for evaluating whether or not to identify a candidate constellation index as corresponding to the underlying constellation, and can consecutively apply tests to different candidate constellations. Constellation recovery algorithm 500 can be performed by constellation recovery system 346 of FIG. 3 and constellation recovery algorithm 408 of FIG. 4. It will be noted that other algorithms for constellation recovery can be used and that the algorithms described herein are for illustrative purposes only.

Constellation recovery algorithm 500 can initialize at step 502 by selecting initial values for any indices used in algorithm 500. In one embodiment, step 502 can select an initial candidate constellation index i to consider, preferably selecting the constellation index i=1, and can set a threshold index, mvalue, to a value, which is preferably infinity.

Step 504 can perform a first test that measures how well the input signal represents signal points of the candidate constellation whose index is currently selected. The first test can generate a value which can be compared to a threshold value. In one embodiment, step 504 can compute an error based on two values: a value of the input signal and a corresponding value representing a signal point in the current candidate constellation that is closest to the input value. The error can be based on a difference between the two elements. Step 504 preferably computes a mean squared error, MSE(i), by averaging a plurality of squared differences. Step 504 then compares the mean squared error to mvalue. Alternatively, step 504 can perform a SNR test (e.g., computing a SNR for the signal coupled to the input signal and comparing it to a SNR threshold index).

If the currently selected constellation index passes the first test (e.g., if the mean squared error is less than mvalue, or the SNR is greater than the SNR threshold index), then constellation recovery algorithm 500 can proceed to step 506. If not, then algorithm 500 can proceed to step 512, which can end algorithm 500. Step 512 preferably identifies the constellation corresponding to the current index as the underlying constellation of the input signal.

Step 506 can perform a second test that measures how well the input signal statistically represents the variety of signal points of the current candidate constellation. More specifically, the second test can measure how well the input signal generates signal points according to a uniform probability distribution over all possible signal points of the current candidate constellation.

A uniform probability distribution over a finite set of outcomes means that each outcome of the set is probabilistically equally likely to occur. Given a sufficient number of experiments, where each experiment independently generates an outcome according to a uniform probability distribution, each outcome has the same expected occurrence rate. An expected occurrence rate of an outcome is the expected ratio of the number of experiments that generate the outcome to the total number of experiments. Alternatively, the second test can use a probability distribution that more closely represents the expected occurrence rates of the signal points (e.g., if the data conveyed by the input signal has known properties that make its distribution substantially non-uniform).

In one embodiment, step 506 can compare the expected occurrence rate for at least one signal point to a measured occurrence rate of that at least one signal point. Here, the measured occurrence rate of an outcome is the ratio of the number of experiments that generate the outcome to the total number of experiments. If the set of candidate constellations includes a square constellation, such as 16-QAM 202, 64-QAM 206, and 256-QAM 210 described above in reference to FIG. 2, step 506 can compare the expected occurrence rate to the measured occurrence rate for at least one corner point of the square constellation. Such a test is called a "corner point test." If the set of candidate constellations includes a cross constellation, such as 32-QAM 204 or 128-QAM 208 described above in reference to FIG. 2, step 506 can still perform the corner point test, but the expected occurrence rate of a corner point for a cross constellation will be zero.

In one implementation, the currently selected constellation index can pass the corner point test if the measured occurrence rate is greater than or substantially equal to the expected occurrence rate multiplied by a factor n, where n is preferably less than or substantially equal to 1. For example, if n is set to be $1/16$, then the currently selected constellation index passes the corner point test if the measured number of occurrences of corner points is at least one-sixteenth of the expected number of occurrences of corner points. More generally, if the measured occurrence rate of some set of signal points is not above some threshold based on the expected occurrence rate of that set of signal points, then the currently selected constellation index can fail the corner point test.

If the currently selected constellation index passes the second test, then constellation recovery algorithm 500 can proceed to step 508, which can reset any threshold indices to reflect that the currently selected constellation index passed both tests. For example, if the first test is a mean squared error test, then step 508 can set mvalue to the mean squared error corresponding to the currently selected constellation index, MSE(i). Constellation recovery algorithm 500 can then proceed to step 510. If the currently selected constellation index fails the second test, then algorithm 500 can proceed to step 510 without performing step 508.

Step 510 can select the next constellation index to consider, and preferably selects the next highest index, i+1. Constellation recovery algorithm 500 can then cycle back to step 504 to run the tests using the next constellation index.

Constellation recovery algorithm 500 can advantageously have more than one test to identify a constellation index. Because some tests are better suited for certain types of channels than others, having more than one test can more accurately identify a constellation index for a wider variety of channels. For example, the mean squared error test alone can potentially identify an incorrect constellation index given a channel with significant noise. In addition, the mean squared error test can be biased towards constellations with a greater number of signal points, because the mean squared error of a relatively dense constellation will tend to be lower than the mean squared error of a relatively sparse constellation. On the other hand, the mean squared error test used in conjunction with the corner point test can display more accuracy, without requiring significantly more computations to implement.

Figure 6:
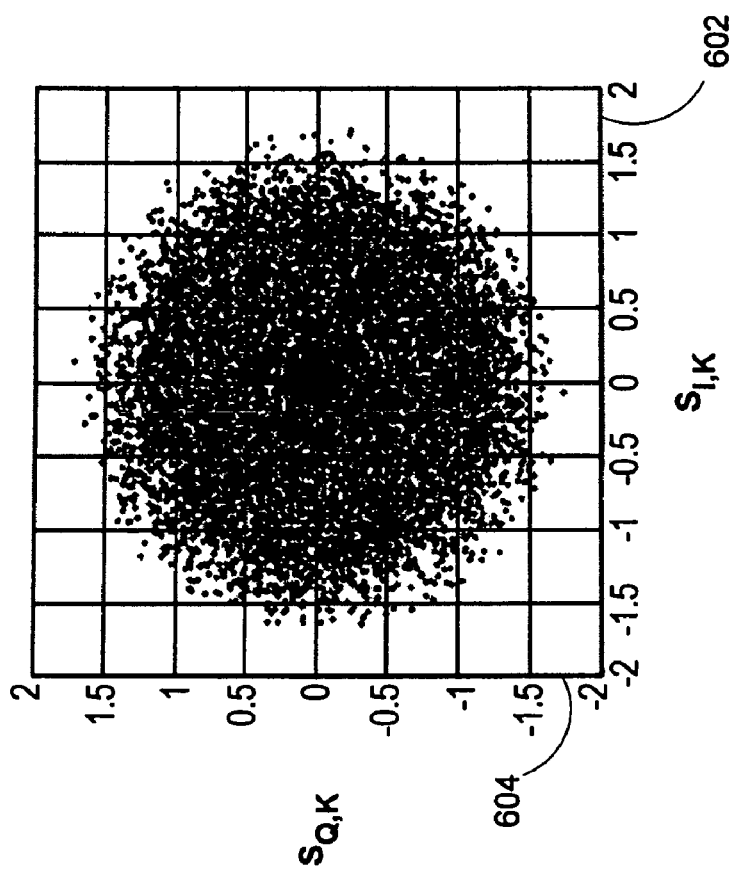
FIG. 6 depicts a graph of an illustrative sampling of an input signal with an unknown constellation.

FIG. 6 depicts a graph of an illustrative sampling 600 of an input signal transmitted using QAM, which can be similar to input signal 302 of FIG. 3. In this illustrative example, the underlying constellation of the input signal is a square constellation having 256 signal points. A horizontal axis 602 and a vertical axis 604 represent the amplitudes of, respectively, the in-phase and quadrature signals of the input signal. The input signal displays significant corruption—neither signal point locations nor a square constellation shape are readily discernible.

Figure 7:
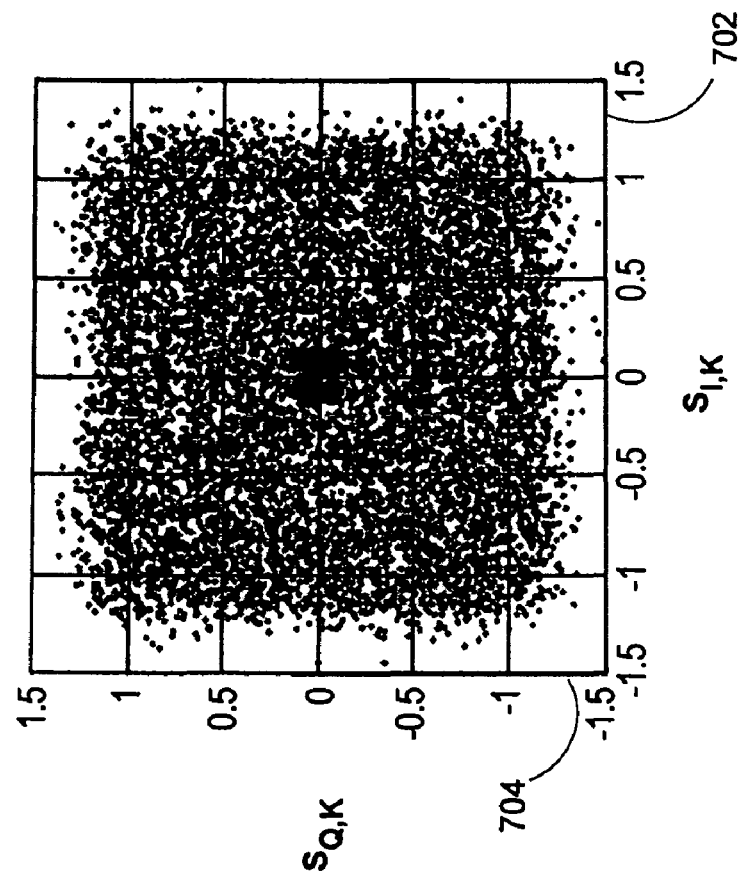
FIG. 7 depicts a graph of an illustrative sampling of a signal that has been equalized in accordance with an embodiment of the invention.

FIG. 7 depicts a graph of an illustrative sampling 700 of an equalized signal, similar to equalized signal 306' of FIG. 3, generated by blind equalization circuitry similar to blind equalization circuitries 344 of FIG. 3. A horizontal axis 702 and a vertical axis 704 represent the amplitudes of, respectively, the in-phase and quadrature signals of the equalized signal. In this illustrative example, the equalized signal is coupled to an input signal whose underlying constellation is a square constellation having 256 signal points, similar to the input signal of FIG. 6. The equalized signal is preferably sampled after the equalization algorithm has substantially stabilized at least one filter value. It will be noted that the equalized signal displays less corruption than the input signal of FIG. 6, as the square constellation shape is somewhat discernible, but the number of signal points is still not readily discernible.

Figure 8:
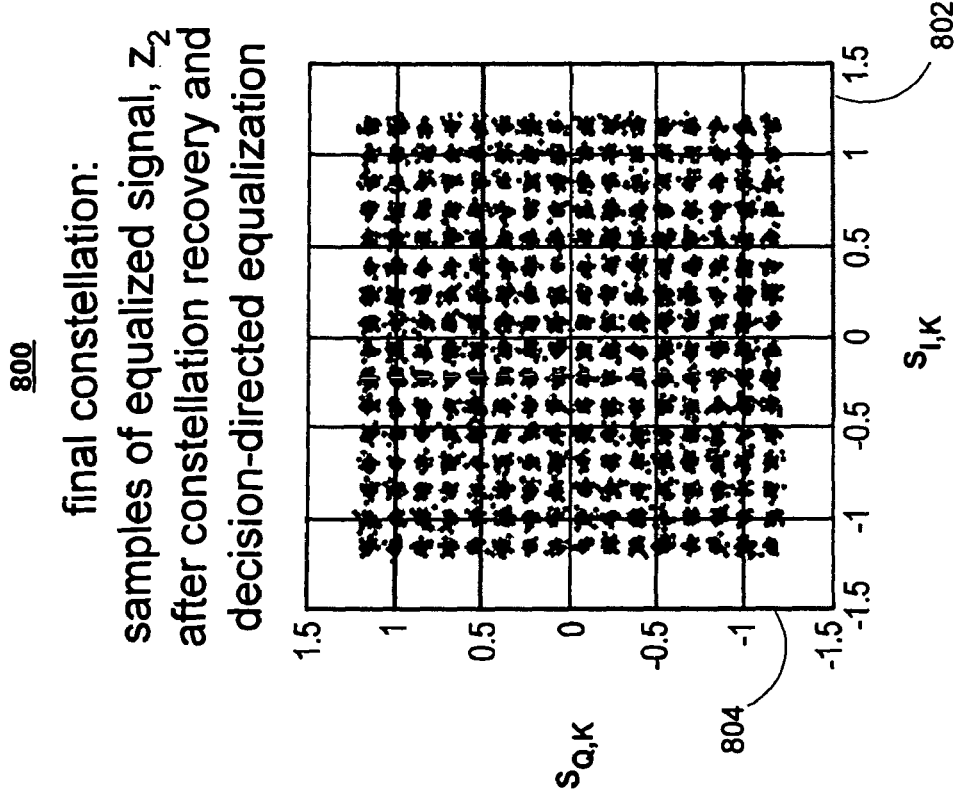
FIG. 8 depicts a graph of another illustrative sampling of a signal that has been equalized in accordance with an embodiment of the invention.

FIG. 8 depicts a graph of an illustrative sampling 800 of an equalized signal, similar to equalized signal 306' of FIG. 3, generated by decision-directed equalization circuitry similar to decision-directed equalization circuitry 348 of FIG. 3. A horizontal axis 802 and a vertical axis 804 represent the amplitudes of, respectively, the in-phase and quadrature signals of the equalized signal. In this illustrative example, the equalized signal is coupled to an input signal whose underlying constellation is a square constellation having 256 signal points, similar to the input signal of FIG. 6. The equalized signal is sampled after the constellation recovery algorithm has identified the underlying constellation and after the decision-directed equalization algorithm has substantially stabilized at least one filter value. It will be noted that the equalized signal displays significantly less corruption than the signals of FIGS. 6 and 7—the square constellation shape, number of signal points, and locations of signals points are all readily discernible.

Referring now to FIGS. 9A-9E, various exemplary implementations of the present invention are shown.

Figure 9A:
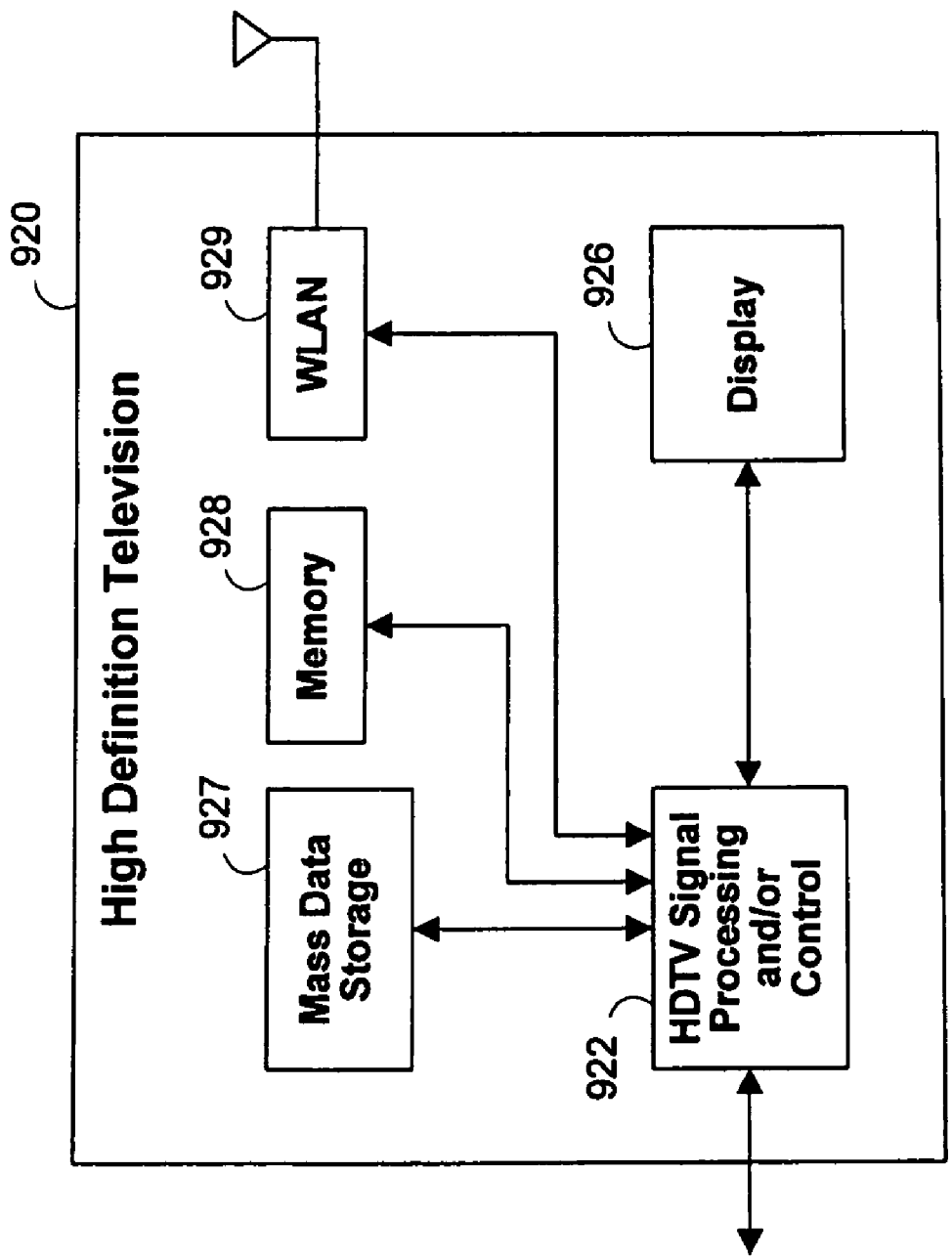
FIG. 9A is a block diagram of an exemplary high definition television that can employ the disclosed technology.

Referring now to FIG. 9A, the present invention can be implemented in a high definition television (HDTV) 920. The present invention may implement either or both signal processing and/or control circuits, which are generally identified in FIG. 9A at 922, a WLAN interface and/or mass data storage of the HDTV 920. The HDTV 920 receives HDTV input signals in either a wired or wireless format and generates HDTV output signals for a display 926. In some implementations, signal processing circuit and/or control circuit 922 and/or other circuits (not shown) of the HDTV 920 may process data, perform coding and/or encryption, perform calculations, format data and/or perform any other type of HDTV processing that may be required.

The HDTV 920 may communicate with mass data storage 927 that stores data in a nonvolatile manner, such as optical and/or magnetic storage devices, for example hard disk drives HDD and/or DVDs. The HDD may be a mini HDD that includes one or more platters having a diameter that is smaller than approximately 1.8". The HDTV 920 may be connected to memory 928 such as RAM, ROM, low latency nonvolatile memory such as flash memory and/or other suitable electronic data storage. The HDTV 920 also may support connections with a WLAN via a WLAN network interface 929.

Figure 9B:
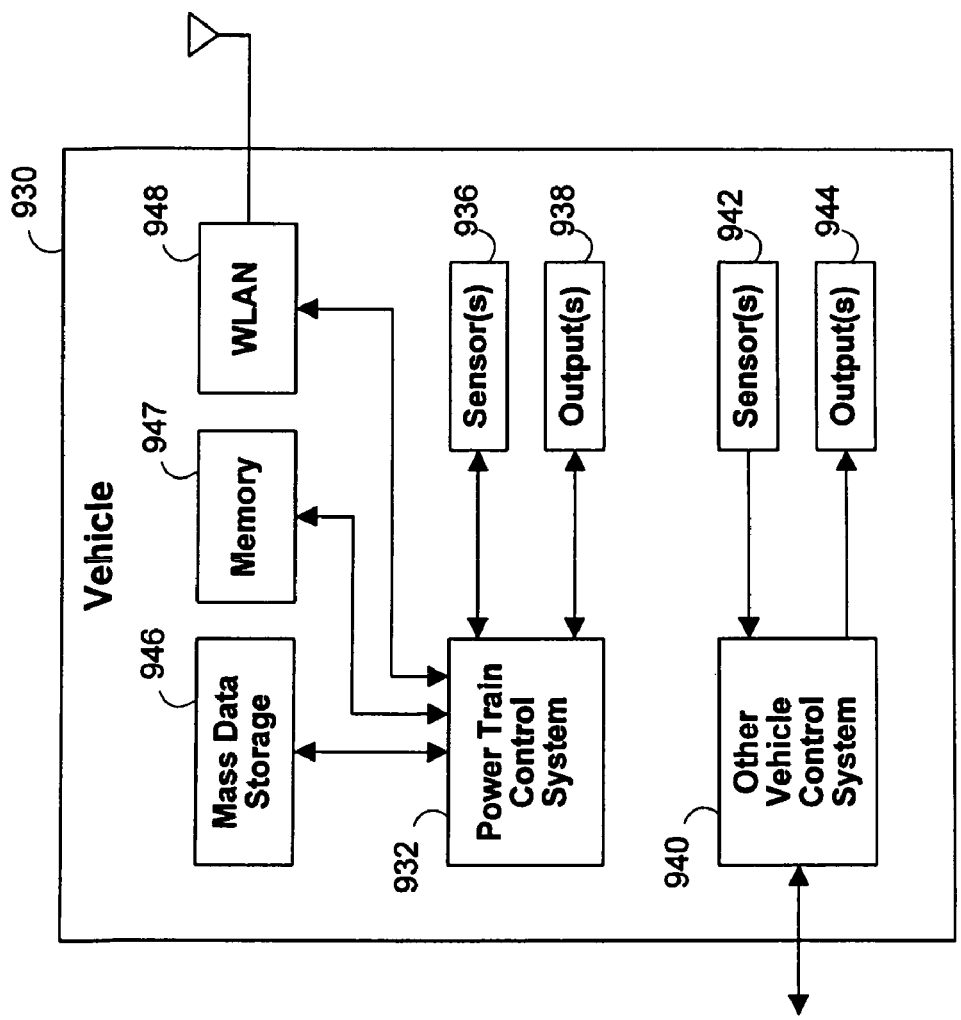
FIG. 9B is a block diagram of an exemplary vehicle that can employ the disclosed technology.

Referring now to FIG. 9B, the present invention implements a control system of a vehicle 930, a WLAN interface and/or mass data storage of the vehicle control system. In some implementations, the present invention may implement a powertrain control system 932 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 940 of the vehicle 930. The control system 940 may likewise receive signals from input sensors 942 and/or output control signals to one or more output devices 944. In some implementations, the control system 940 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 932 may communicate with mass data storage 946 that stores data in a nonvolatile manner. The mass data storage 946 may include optical and/or magnetic storage devices for example hard disk drives HDD and/or DVDs. The HDD may be a mini HDD that includes one or more platters having a diameter that is smaller than approximately 1.8". The powertrain control system 932 may be connected to memory 947 such as RAM, ROM, low latency nonvolatile memory such as flash memory and/or other suitable electronic data storage. The powertrain control system 932 also may support connections with a WLAN via a WLAN network interface 948. The control system 940 may also include mass data storage, memory and/or a WLAN interface (all not shown).

Figure 9C:
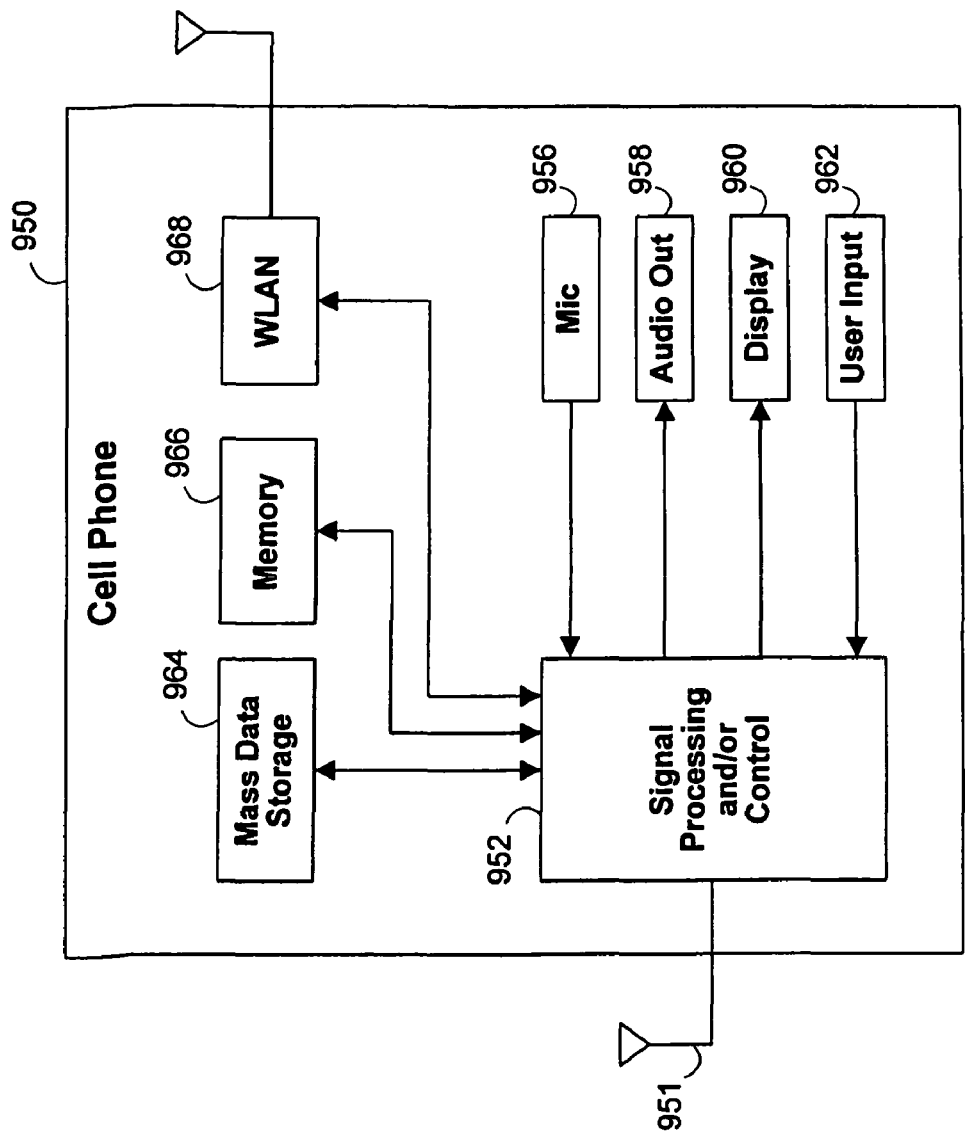
FIG. 9C is a block diagram of an exemplary cellular phone that can employ the disclosed technology.

Referring now to FIG. 9C, the present invention can be implemented in a cellular phone 950 that may include a cellular antenna 951. The present invention may implement either or both signal processing and/or control circuits, which are generally identified in FIG. 9C at 952, a WLAN interface and/or mass data storage of the cellular phone 950. In some implementations, the cellular phone 950 includes a microphone 956, an audio output 958 such as a speaker and/or audio output jack, a display 960 and/or an input device 962 such as a keypad, pointing device, voice actuation and/or other input device. The signal processing and/or control circuits 952 and/or other circuits (not shown) in the cellular phone 950 may process data, perform coding and/or encryption, perform calculations, format data and/or perform other cellular phone functions.

The cellular phone 950 may communicate with mass data storage 964 that stores data in a nonvolatile manner such as optical and/or magnetic storage devices for example hard disk drives HDD and/or DVDs. The HDD may be a mini HDD that includes one or more platters having a diameter that is smaller than approximately 1.8". The cellular phone 950 may be connected to memory 966 such as RAM, ROM, low latency nonvolatile memory such as flash memory and/or other suitable electronic data storage. The cellular phone 950 also may support connections with a WLAN via a WLAN network interface 968.

Figure 9D:
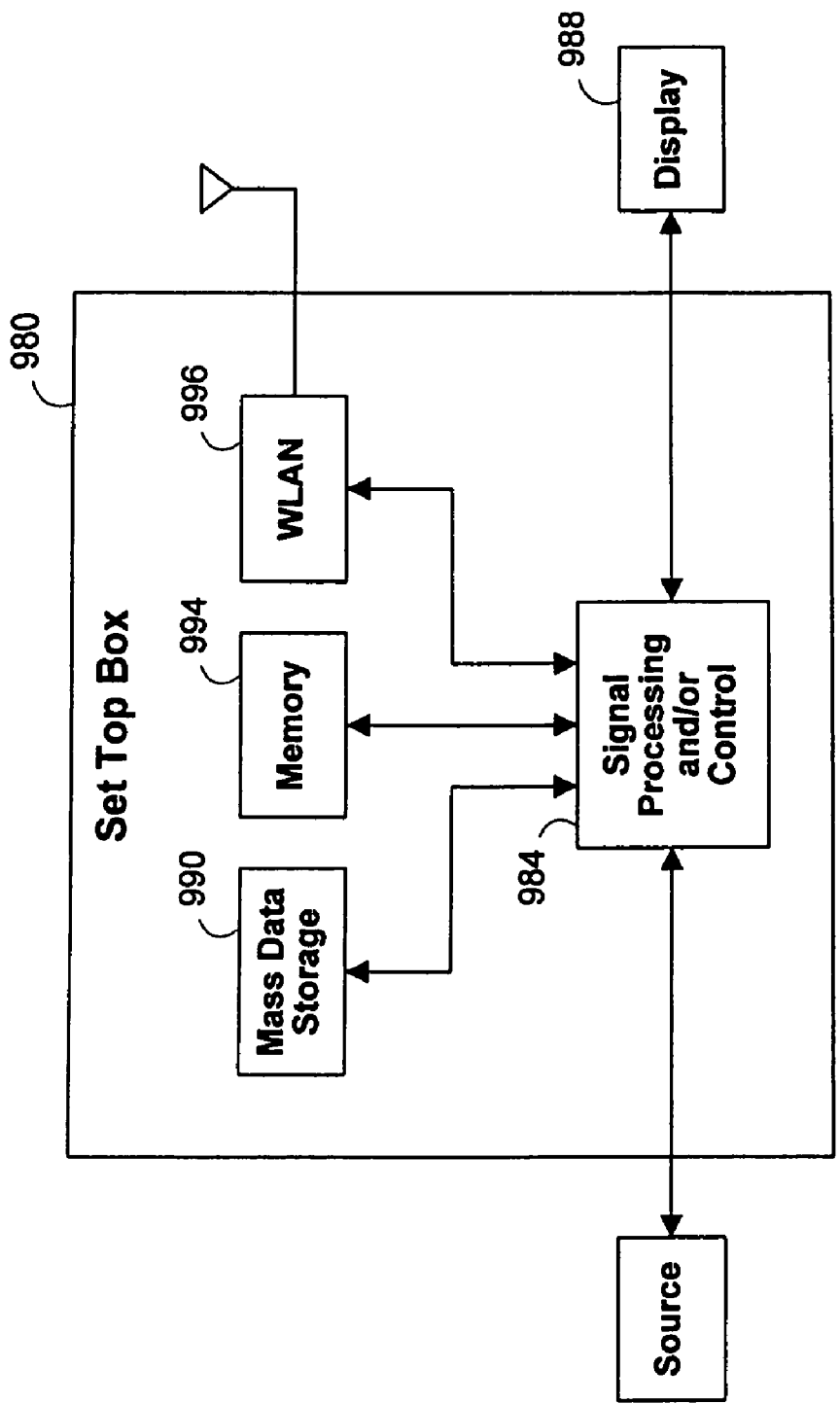
FIG. 9D is a block diagram of an exemplary set top box that can employ the disclosed technology.

Referring now to FIG. 9D, the present invention can be implemented in a set top box 980. The present invention may implement either or both signal processing and/or control circuits, which are generally identified in FIG. 9D at 984, a WLAN interface and/or mass data storage of the set top box 980. The set top box 980 receives signals from a source such as a broadband source and outputs standard and/or high definition audio/video signals suitable for a display 988 such as a television and/or monitor and/or other video and/or audio output devices. The signal processing and/or control circuits 984 and/or other circuits (not shown) of the set top box 980 may process data, perform coding and/or encryption, perform calculations, format data and/or perform any other set top box function.

The set top box 980 may communicate with mass data storage 990 that stores data in a nonvolatile manner. The mass data storage 990 may include optical and/or magnetic storage devices for example hard disk drives HDD and/or DVDs. The HDD may be a mini HDD that includes one or more platters having a diameter that is smaller than approximately 1.8". The set top box 980 may be connected to memory 994 such as RAM, ROM, low latency nonvolatile memory such as flash memory and/or other suitable electronic data storage. The set top box 980 also may support connections with a WLAN via a WLAN network interface 996.

Figure 9E:
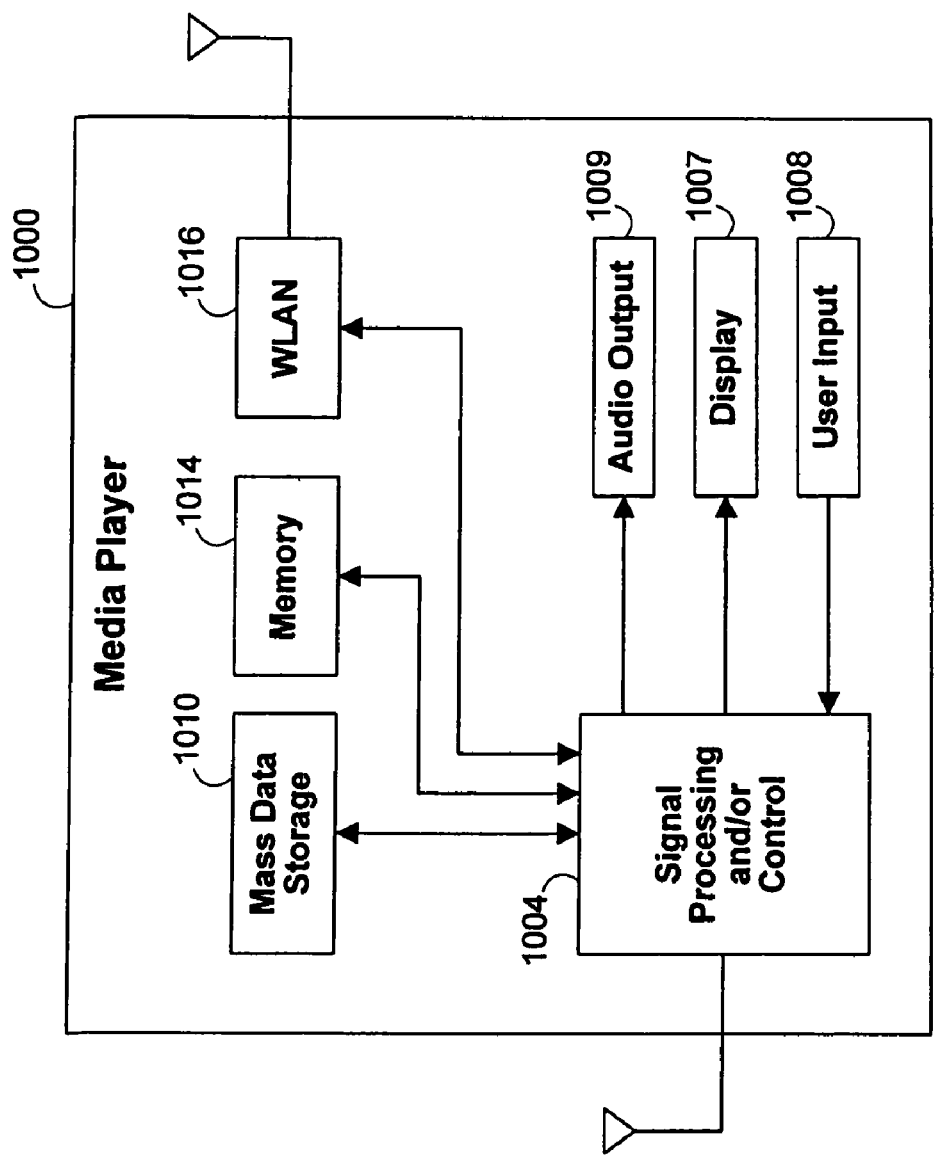
FIG. 9E is a block diagram of an exemplary media player that can employ the disclosed technology.

Referring now to FIG. 9E, the present invention can be implemented in a media player 1000. The present invention may implement either or both signal processing and/or control circuits, which are generally identified in FIG. 9E at 1004, a WLAN interface and/or mass data storage of the media player 1000. In some implementations, the media player 1000 includes a display 1007 and/or a user input 1008 such as a keypad, touchpad and the like. In some implementations, the media player 1000 may employ a graphical user interface (GUI) that typically employs menus, drop down menus, icons and/or a point-and-click interface via the display 1007 and/or user input 1008. The media player 1000 further includes an audio output 1009 such as a speaker and/or audio output jack. The signal processing and/or control circuits 1004 and/or other circuits (not shown) of the media player 1000 may process data, perform coding and/or encryption, perform calculations, format data and/or perform any other media player function.

The media player 1000 may communicate with mass data storage 1010 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 1000 may be connected to memory 1014 such as RAM, ROM, low latency nonvolatile memory such as flash memory and/or other suitable electronic data storage. The media player 1000 also may support connections with a WLAN via a WLAN network interface 1016. Still other implementations in addition to those described above are contemplated.

Thus it is seen that methods and apparatus are provided for achieving efficient and reliable equalization of distortion caused by channels. One skilled in the art will appreciate that the invention can be practiced by embodiments other than those described, which are presented for the purposes of illustration and not of limitation, and the present invention is limited only by the claims which follow.

What is claimed is:

1. A method of receiving an input signal, said method comprising:
    selecting, by candidate selector circuitry, a current candidate quadrature amplitude modulation (QAM) constellation from a plurality of candidate QAM constellations, wherein each QAM constellation comprises a plurality of points with which said input signal may be transmitted;
    computing, by mean squared error computing circuitry, a mean squared error of a signal responsive to said input signal based on said current candidate QAM constellation; and
    comparing, by mean squared error comparison circuitry, said computed mean squared error to a threshold error value.

2. The method of claim 1 further comprising:
    selecting a previous candidate QAM constellation from said plurality of candidate QAM constellations; and
    identifying said previous candidate QAM constellation as a recovered QAM constellation based on a result of said comparing.

3. The method of claim 2 wherein said identifying occurs if said computed mean squared error is substantially greater than said threshold error value.

4. The method of claim 2 wherein said selecting said current candidate QAM constellation comprises setting a candidate QAM constellation index to a number corresponding to said current candidate QAM constellation.

5. The method of claim 4 wherein said identifying said previous candidate QAM constellation as said recovered QAM constellation comprises setting an output QAM constellation index to be substantially equal to a number corresponding to said previous candidate QAM constellation.

6. The method of claim 1 further comprising comparing a measured occurrence rate of said signal responsive to said input signal at a selected point in said current candidate QAM constellation to an occurrence threshold value.

7. The method of claim 6 wherein said selected point is a corner point of said current candidate QAM constellation.

8. The method of claim 6 wherein said occurrence threshold value is substantially equal to a factor multiplied by an expected occurrence rate at said selected point of said signal responsive to said input signal.

9. The method of claim 8 wherein said factor is substantially less than 1.

10. The method of claim 6 wherein said comparing said measured occurrence rate to said occurrence threshold value occurs if said computed mean squared error is substantially less than said threshold error value.

11. The method of claim 6 further comprising setting a next threshold error value to be substantially equal to said computed mean squared error.

12. The method of claim 11 wherein said setting occurs if said measured occurrence rate is substantially greater than said occurrence threshold value.

13. The method of claim 1 further comprising selecting a next candidate QAM constellation if said computed mean squared error is substantially less than said threshold error value.

14. The method of claim 1 further comprising setting said threshold error value to be substantially equal to infinity.

15. The method of claim 2 further comprising performing blind equalization on said input signal, wherein said signal responsive to said input signal is responsive to an output signal of said blind equalization.

16. The method of claim 15 further comprising altering said blind equalization based on said recovered QAM constellation.

17. The method of claim 16 wherein:
said performing said blind equalization comprises filtering said input signal with a plurality of filter values; and
said altering said blind equalization comprises altering at least one of said plurality of filter values.

18. The method of claim 16 further comprising:
generating a scaling factor based on said recovered QAM constellation; and
scaling said output signal of said blind equalization by said scaling factor to generate a scaled output signal.

19. The method of claim 18 further comprising performing decision directed equalization on said input signal.

20. The method of claim 19 wherein:
said performing said decision directed equalization comprises selecting a point from said recovered QAM constellation; and
said selected point corresponds to a value of said scaled output signal.

21. The method of claim 20 wherein said altering said blind equalization is based on said selected point.

22. A method of operating a television comprising the method of claim 1.

23. A method of operating a set-top box comprising the method of claim 1.

24. Circuitry for receiving an input signal, said circuitry comprising:
candidate selector circuitry operable to select a current candidate QAM constellation from a plurality of candidate QAM constellations, wherein each QAM constellation comprises a plurality of points with which said input signal may be transmitted;
mean squared error computing circuitry responsive to said candidate selector circuitry and operable to compute a mean squared error of a signal responsive to said input signal based on said current candidate QAM constellation; and
mean squared error comparison circuitry responsive to said mean squared error computing circuitry and operable to compare said computed mean squared error to a threshold error value.

25. The circuitry of claim 24 further comprising identification circuitry responsive to said mean squared error comparison circuitry and operable to identify a previous candidate QAM constellation from said plurality of candidate QAM constellations as a recovered QAM constellation based on a result of said mean squared error comparison circuitry, wherein said candidate selector circuitry is further operable to select said previous candidate QAM constellation.

26. The circuitry of claim 25 wherein said identification circuitry is operable to identify said previous candidate QAM constellation as said recovered QAM constellation if said computed mean squared error is substantially greater than said threshold error value.

27. The circuitry of claim 25 wherein said candidate selector circuitry is further operable to set a candidate QAM constellation index to a number corresponding to said current candidate QAM constellation.

28. The circuitry of claim 27 wherein said identification circuitry is further operable to set an output QAM constellation index to be substantially equal to a number corresponding to said previous candidate QAM constellation.

29. The circuitry of claim 24 further comprising occurrence rate comparison circuitry responsive to said mean squared error comparison circuitry and operable to compare a measured occurrence rate of said signal responsive to said input signal at a selected point in said current candidate QAM constellation to an occurrence threshold value.

30. The circuitry of claim 29 wherein said selected point is a corner point of said current candidate QAM constellation.

31. The circuitry of claim 29 wherein said occurrence threshold value is substantially equal to a factor multiplied by an expected occurrence rate at said selected point of said signal responsive to said input signal.

32. The circuitry of claim 31 wherein said factor is substantially less than 1.

33. The circuitry of claim 29 wherein said occurrence rate comparison circuitry is operable to compare said measured occurrence rate to said occurrence threshold value if said computed mean squared error is substantially less than said threshold error value.

34. The circuitry of claim 29 further comprising threshold setting circuitry responsive to said occurrence rate comparison circuitry and operable to set a next threshold error value to be substantially equal to said computed mean squared error.

35. The circuitry of claim 34 wherein said threshold setting circuitry is operable to set said next threshold error value if said measured occurrence rate is substantially greater than said occurrence threshold value.

36. The circuitry of claim 24 wherein said candidate selector circuitry is responsive to said mean squared error comparison circuitry and is further operable to select a next candidate QAM constellation if said computed mean squared error is substantially less than said threshold error value.

37. The circuitry of claim 24 further comprising threshold setting circuitry operable to set said threshold error value to be substantially equal to infinity, wherein said mean squared error circuitry is further responsive to said threshold setting circuitry.

38. The circuitry of claim 25 further comprising blind equalization circuitry responsive to said input signal and operable to perform blind equalization on said input signal, wherein said signal responsive to said input signal is responsive to an output signal of said blind equalization circuitry.

39. The circuitry of claim 38 further comprising alteration circuitry responsive to said identification circuitry and operable to alter said blind equalization circuitry based on said recovered QAM constellation.

40. The circuitry of claim 39 wherein:
said blind equalization circuitry is operable to filter said input signal with a plurality of filter values; and
said alteration circuitry is operable to alter at least one of said plurality of filter values.

41. The circuitry of claim 39 further comprising:
factor circuitry responsive to said identification circuitry and operable to generate a scaling factor based on said recovered QAM constellation; and
scaling circuitry responsive to said factor circuitry and operable to scale said output signal of said blind equalization by said scaling factor to generate a scaled output signal.

42. The circuitry of claim 41 further comprising decision directed equalization circuitry responsive to said scaling circuitry and operable to perform decision directed equalization on said input signal.

43. The circuitry of claim 42 wherein:
said decision directed equalization circuitry is operable to select a point from said recovered QAM constellation; and
said selected point corresponds to a value of said scaled output signal.

44. The circuitry of claim 43 wherein said alteration circuitry is operable to alter said blind equalization circuitry based on said selected point.

45. A television comprising the circuitry of claim 24.

46. A set-top box comprising the circuitry of claim 24.

* * * * *